United States Patent
Wang et al.

(10) Patent No.: US 12,234,521 B2
(45) Date of Patent: Feb. 25, 2025

(54) METHOD FOR CONTROLLING NITROGEN IN STEELMAKING BY SPRAYING HYDROGEN CONTAINING PLASMA

(71) Applicants: Xuanhua Iron and Steel Group Co., Ltd., Zhangjiakou (CN); University of Science and Technology Beijing, Beijing (CN); HBZX HIGH TECH CO., LTD., Zhangjiakou (CN)

(72) Inventors: Hongbin Wang, Beijing (CN); Guangsheng Wei, Beijing (CN); Rong Zhu, Beijing (CN); Minghai Zhang, Beijing (CN); Jinlong Wang, Beijing (CN); Jianping Jia, Beijing (CN); Yongqiang Yang, Beijing (CN); Jianzhong Wang, Beijing (CN); Yunxiang Zhao, Beijing (CN); Xin Li, Beijing (CN); Ceng Li, Beijing (CN); Huan Chang, Beijing (CN)

(73) Assignees: Xuanhua Iron and Steel Group Co., Ltd., Zhangjiakou (CN); University of Science and Technology Beijing, Beijing (CN); HBZX HIGH TECH CO., LTD., Zhangjiakou (CN)

( * ) Notice: Subject to any disclaimer, the term of this patent is extended or adjusted under 35 U.S.C. 154(b) by 0 days.

(21) Appl. No.: 18/670,631

(22) Filed: May 21, 2024

(65) Prior Publication Data
US 2024/0401161 A1    Dec. 5, 2024

(30) Foreign Application Priority Data
May 31, 2023    (CN) .......................... 202310631308.5

(51) Int. Cl.
C21C 7/072    (2006.01)
C21C 5/52    (2006.01)
(Continued)

(52) U.S. Cl.
CPC ................ *C21C 7/072* (2013.01); *C21C 5/52* (2013.01); *C21C 7/0087* (2013.01); *C21C 7/06* (2013.01); *C21C 7/064* (2013.01); *C21C 7/10* (2013.01)

(58) Field of Classification Search
CPC ......... C21C 7/072; C21C 5/52; C21C 7/0087; C21C 7/06; C21C 7/064; C21C 7/10
(Continued)

(56) References Cited

U.S. PATENT DOCUMENTS

| | | |
|---|---|---|
| 9,267,211 B2 | 2/2016 | Gilliam et al. |
| 10,633,726 B2 | 4/2020 | Chinella |
| 10,920,309 B2 | 2/2021 | Kaup et al. |

FOREIGN PATENT DOCUMENTS

CN    100535153 C    *  9/2009

OTHER PUBLICATIONS

CN 100535153C Translation (Year: 2009).*

* cited by examiner

*Primary Examiner* — Brian D Walck
*Assistant Examiner* — Danielle Carda (57) ABSTRACT

The application provides a method for controlling nitrogen in steelmaking by spraying hydrogen containing plasma, including: using a mixture of hydrogen rich gas and argon gas to generate hydrogen plasma for denitrification of molten steel during at least one of arc furnace smelting, ladle refining, VOD refining, and RH refining. The method for controlling nitrogen in steelmaking by spraying hydrogen containing plasma provided in the application can effectively remove nitrogen from the molten steel by spraying a mixture of argon gas and hydrogen rich gas into the molten steel through a hollow electrode and plasma torch, reducing electrode consumption and electricity consumption per ton (Continued)

steel, and also reducing arc radiation heat loss, improving heating rate, thereby shortening smelting time and reducing production costs.

5 Claims, 2 Drawing Sheets

(51) Int. Cl.
    *C21C 7/00*     (2006.01)
    *C21C 7/06*     (2006.01)
    *C21C 7/064*     (2006.01)
    *C21C 7/10*     (2006.01)
(58) Field of Classification Search
    USPC .............................................. 75/10
    See application file for complete search history.

METHOD FOR CONTROLLING NITROGEN IN STEELMAKING BY SPRAYING HYDROGEN CONTAINING PLASMA

CROSS-REFERENCE TO RELATED APPLICATIONS

This application claims priority to Chinese Patent Application No. 202310631308.5 with a filing date of Nov. 17, 2023. The content of the aforementioned application, including any intervening amendments thereto, is incorporated herein by reference.

FIELD

The application relates to the field of metallurgy, particularly to a method for controlling nitrogen in steelmaking by spraying hydrogen containing plasma.

BACKGROUND

Typically, nitrogen is harmful for most of the steel. The pinning effect of nitrogen atoms on dislocations increases the strength and hardness of steel, while reducing its plasticity and impact toughness, which will be harmful to the subsequent rolling and processing. Nitrogen can also result in aging precipitation hardening or aging brittleness in steel. Nitrogen also results in blue brittleness in steel, especially for low-carbon steel. All tests have shown that within the range of 150-450° C. (usually the bluing temperature for metal manufacturing), due to the precipitation of Fe4N nitride, the tensile strength of the steel increases to a peak and then falls back, resulting in a decrease in its impact toughness. Therefore, some weather-proof steel and automotive steel require a nitrogen content of around 50 ppm, while IF steel and ultrapure ferritic stainless steel require a nitrogen content below 30 ppm. Currently, the main process for preparing low nitrogen steel is blast furnace+converter+LF (Ladle Refining)+VOD (Vacuum Oxygen Decarburization)/RH (Ruhstahl hausen). However, for the short steelmaking process of arc furnace, it is difficult to control the nitrogen content in steel, mainly because the arc generated by the electrodes ionizes the air and absorbs nitrogen, resulting in a continuous increase of nitrogen content in steel. Besides, the denitrification rate of the subsequent vacuum treatments such as VD/RH generally is 20-30%. For the production of steel with ultra-low nitrogen content, LF refining is rarely used in the current process in China, which results in a more stringent production process for steel with ultra-low nitrogen content and a lower error rate in the process, because it is difficult to control the nitrogen content in steel during LF refining. Therefore, it is urgent to propose a method to control the nitrogen content in steel during refining, so as to increase the steel variety produced by the short steelmaking process and make the production of steel with ultra-low nitrogen content easy in long steelmaking process.

Chinese application number CN1453372A discloses a refined denitrification method for molten steel, which forms a glow plasma of a mixture of argon and hydrogen above the molten steel through a DC pulse electric field. The nitrogen in the molten steel interacts with the glow plasma, and the ionized nitrogen escapes and reacts with hydrogen gas to generate nitrogen and ammonia, which are extracted by a vacuum system to achieve denitrification of the molten steel. The final nitrogen content is 25 ppm. However, this method can control the nitrogen content in the front-end process, which results in a longer vacuum treatment when the nitrogen content in the incoming molten steel is high, affecting the production efficiency. Chinese application number CN103993132A discloses a method for refining low nitrogen steel in an LF furnace, which uses a graphite hollow electrode to blow argon gas throughout the molten steel to form an inert protective gas on the surface of the steel slag, and simultaneously uses bottom blown argon gas to stir the molten steel. A vacuum chamber with argon gas is used to remove nitrogen from the molten steel. However, this method only sprays Ar for protection, while bottom blown argon has a limited nitrogen removal ability in the ladle refining process, and the overall trend is still increasing. Chinese application number 200910244373.2 discloses a smelting method for controlling nitrogen content in low-carbon steel, including: hot metal desulfurization pretreatment, converter smelting, furnace refining, vacuum refining, and slab continuous casting, which uses secondary refining to control the nitrogen content in the molten steel. The specific refining steps include: using submerged arc operation in the furnace refining, controlling the heating time, reducing nitrogen-increasing vacuum treatment and increasing hydrogen flow rate, increasing vacuum time and reducing vacuum degree, and strengthening denitrification. The nitrogen content of steel can be removed to below 40 ppm by this method. This method can reduce the electrification time, but cannot significantly solve the problem of nitrogen increasing in the process. It also adopts secondary refining, which increases the production cost of the steelmaking process. Chinese application number CN200610118710. X discloses a method for controlling carbon and nitrogen content in ultra-pure ferritic stainless steel treated in a ladle refining furnace. During the ladle refining process, the mixture of coke oven gas and argon gas is sprayed through a center hole of the graphite electrode in the refining furnace, forming a hydrogen containing plasma arc at a lower end of the electrode to achieve decarburization and denitrification of the molten steel. The disadvantage of this method is that the nitrogen content in the incoming molten steel is about 150 ppm which is high, so the refining time is longer, about 30 minutes for power transmission, and the total refining time is about 60 minutes. The Chinese application number CN115595401A discloses a steel refining equipment and steelmaking method for improving the cleanliness of molten steel. It mainly adds a bottom electrode, hollow graphite electrode (plasma gun), and composite bottom blowing spray gun based on an electric induction heating vacuum furnace, which can complete tasks such as decarburization, denitrification, desulfurization, and deoxygenation in one go. However, this method has a significant change to the equipment, a longer smelting cycle, and a weak adsorption capacity for inclusions in steel due to the small amount of slag. Chinese application number CN115679036A discloses a low-carbon and oxygen-deficient hydrogen containing plasma arc furnace steelmaking device and steelmaking method. The main equipment comprises a plasma melting furnace and a vertical shaft connected to the plasma melting furnace, and a hydrogen rich plasma gun and bottom anode are installed on the plasma melting furnace for heating scrap steel. However, it only refers to nitrogen control for arc furnace steelmaking, and the steelmaking process exposed to air will inevitably lead to an increase of the nitrogen content of the molten steel, and the method does not involve nitrogen control in subsequent refining processes.

Currently, the nitrogen content in steel produced by the arc furnace is 60-200 ppm, the nitrogen content in the LF refining increases by 5-20 ppm, and the denitrification rate in the VOD/RH vacuum refining process is 10-30%. Even after VOD/RH vacuum refining, the nitrogen content in steel still cannot meet the requirements of low nitrogen steel (below 40 ppm). Therefore, there is no mature short process smelting process for low nitrogen steel in China. The nitrogen content in steel produced by the converter is relatively low between 20-50 ppm. If steel with ultra-low nitrogen content is produced, further deep denitrification is performed through VOD or RH, which requires strict requirements for indicators such as steel temperature and oxygen content in the steel during converter steelmaking. Therefore, the production of steel with ultra-low nitrogen content is more difficult.

In summary, it is necessary to provide a method for controlling nitrogen in molten steel, while ensuring the overall production, to achieve the smelting of low nitrogen steel with arc furnace+LF+VOD/RH and the production of steel with ultra-low nitrogen content with converter+LF+VOD/RH.

SUMMARY

The application is to provide a method for controlling nitrogen in steelmaking by spraying hydrogen containing plasma, in order to solve the above problems.

To achieve the above purposes, the following technical solutions are adopted in the application:

A method for controlling nitrogen in steelmaking by spraying hydrogen containing plasma, wherein,
  when performing at least one of arc furnace smelting, ladle refining, VOD refining, and RH refining, using a mixture of hydrogen rich gas and argon gas to generate hydrogen plasma for denitrification of molten steel;
  the arc furnace smelting comprises: spraying argon gas into the furnace through a hollow electrode, with a gas flow rate 10-30 NL/min/t, an inlet gas pressure 0.1-1.0 MPa, and a bottom blown argon gas flow rate of 1-5 NL/min/t; before performing power transmission and forming a molten pool, spraying the mixture of hydrogen rich gas and argon gas into the molten steel through a hollow graphite electrode, with a proportion of hydrogen rich gas of 5%-80%, a flow rate of 10-30 NL/min/t, an inlet gas pressure 0.1-1.0 MPa, and the bottom blown argon flow rate of 1-5 NL/min/t; from forming the molten pool to completely melting, spraying the mixture of hydrogen rich gas and argon gas into the molten steel through the hollow graphite electrode, with a proportion of hydrogen rich gas of 5%-80%, a flow rate of 20-30 NL/min/t, an inlet gas pressure 0.1-1.0 MPa, and the bottom blown argon flow rate of 2-6 NL/min/t; from completely melting to steelmaking, spraying the mixture of hydrogen rich gas and argon gas into the molten steel through the hollow graphite electrode, with a proportion of hydrogen rich gas of 10%-80%, a flow rate of 10-20 NL/min/t, an inlet gas pressure 0.1-1.0 MPa, and the bottom blown argon gas flow rate of 2-6 NL/min/t; during steelmaking, stopping the hollow graphite electrode from blowing gas;
  the ladle refining comprises: adding refining slag after the previous process of steelmaking to cover a molten steel surface, preventing the molten steel from absorbing nitrogen; after moving a ladle car to a refining station, descending the hollow graphite electrode to 30-50 cm above a molten steel level, and introducing pure argon gas with a gas flow rate 10-20 NL/min/t, and an inlet gas pressure 0.1-0.6 MPa; during desulfurization of the molten steel under stirring, introducing pure argon gas with a gas flow rate 25-30 NL/min/t and an inlet gas pressure 0.1-0.6 MPa; after desulfurization under stirring, adding slag material, deoxidizer, and alloy to the ladle, introducing pure argon gas into the hollow graphite electrode, with a gas flow rate 5-10 NL/min/t and an inlet gas pressure 0.1-0.6 MPa; when performing power transmission for slagging, introducing the mixture of hydrogen rich gas and argon gas into the hollow graphite electrode, with a proportion of hydrogen rich gas of 5-80%, a total gas flow rate of 5-10 NL/min/t, and an inlet gas pressure 0.1-0.6 MPa; after slagging, the slag covers the arc as foam, the proportion of hydrogen rich gas is 5-80%, with a total gas flow 20-30 NL/min/t, and the inlet gas pressure is 0.4-0.5 MPa; after power transmission, lifting the hollow graphite electrode 30-50 cm above the molten steel, introducing pure argon gas, with a gas flow rate 10-20 NL/min/t and an inlet gas pressure 0.1-0.6 MPa; after refining the lade, stopping the hollow graphite electrode from blowing air, lifting the electrode to a highest limit, and moving the ladle car to a hanging position;
  the VOD refining process comprises: adjusting the bottom blown gas flow rate to 200 NL/min when vacuuming to 20-25 kPa, and simultaneously turning on a plasma torch to spray the mixture of hydrogen rich gas and argon gas, with a total flow rate of the mixture of 1-8 NL/min/t, a proportion of the hydrogen rich gas of 5%-80%, a total gas source pressure of 0.1-0.5 MPa, and a spraying time of 2-3 minutes; vacuuming to 3-10 kPa, stirring by bottom blowing, increasing the bottom blown gas flow rate to 500 NL/min, and keeping parameters of the plasma torch for spraying the mixture of hydrogen rich gas and argon gas; vacuuming to below 67 Pa, increasing the bottom blown gas flow rate to 800 NL/min, increasing the mixture flow rate of hydrogen rich gas and argon sprayed by the plasma torch to 2-10 NL/min/t, increasing the proportion of hydrogen rich gas to 20%-80%, and increasing the total gas source pressure to 0.1-0.5 MPa, and spraying for 10-15 minutes; stopping the plasma torch from spraying, keeping the bottom blown gas flow rate unchanged, keeping the vacuum degree below 67 Pa, keeping the pressure for 5-10 minutes, and removing H from the molten steel;
  the RH refining process comprises: keeping the vacuum degree 7-10 kPa, turning on the plasma torch to blow the mixture of hydrogen rich gas and argon gas for pre-denitrification, with a total flow rate of 1-8 NL/min/t of the mixture, with the proportion of hydrogen rich gas of 5%-80%, a total gas source pressure 0.1-0.5 MPa, and processing for 2-3 minutes; vacuuming to below 3 kPa, spraying the mixture of hydrogen rich gas and argon gas by the plasma torch, keeping the spraying parameters unchanged, and performing initial denitrification for 3-5 minutes; vacuuming to below 67 Pa, spraying the mixture of hydrogen rich gas and argon gas into the plasma torch, increasing the total gas flow rate to 2-10 NL/min/t, and increasing the proportion of hydrogen rich gas to 20%-80%, performing deep denitrification while keeping the total gas source pressure unchanged, and processing for 10-15 minutes; stopping the plasma torch from spraying, keeping the vacuum degree below 67 Pa, further processing for 5-10 minutes, and removing H from the molten steel.

Preferably, a pore size of the hollow graphite electrode is 2%-6% of an electrode diameter.

Preferably, the gas source pressure of the mixture of hydrogen rich gas and argon gas is 0.1-1.5 MPa.

Preferably, during refining the ladle, a temperature of the molten steel entering the ladle is 1580-1630° C.

Preferably, the desulfurization time under intense stirring is 3-5 minutes.

Preferably, after intensely stirring for desulfurization, adding deoxidizer to the ladle, then adding alloy, and finally adding slagging material, determining an addition amount of the deoxidizer based on incoming oxygen content, determining an addition amount of the alloy based on incoming composition, and the addition amount of the slagging material is 2-6 kg/t.

Preferably, the slagging time is 3-5 minutes.

Preferably, after slagging, the bottom blown gas flow rate is 3-6 NL/min/t.

Preferably, there are multiple hollow graphite electrodes arranged, each of which meets the flow requirements.

Preferably, the hydrogen rich gas comprises one or more of CH4, H2, and coke oven gas after denitrification.

Compared with the existing technology, the beneficial effects of the application include:

The method for controlling nitrogen in steelmaking by spraying hydrogen containing plasma provided in the application involves: spraying Ar+hydrogen rich gas into the molten steel through a graphite hollow electrode in stages during the arc furnace smelting. The hydrogen rich gas is ionized into a hydrogen plasma using the arc generated at the lower end of the electrode, and further reacts with N in the molten steel to generate ammonia gas, which will escape from the molten steel. Similarly, in the ladle refining process, Ar+hydrogen rich gas is also sprayed using a graphite hollow electrode for nitrogen reduction. Subsequently, during the VOD/RH vacuum treatment, a plasma torch is used to spray hydrogen rich plasma into the molten steel, further removing N from the molten steel. This method can be used for both short smelting process in arc furnaces and long smelting process in blast furnaces and converters. Besides, it will not affect the normal smelting process, and N in the steel can be controlled at a very low level, thereby achieving the goal of efficient denitrification in the arc furnace steelmaking process and efficient production of steel with ultra-low nitrogen content in the converter long process.

BRIEF DESCRIPTION OF THE DRAWINGS

In order to provide a clearer explanation of the technical solution of the present embodiment, a brief introduction will be given below to the accompanying drawings required in the embodiments. It should be understood that the following drawings only illustrate certain embodiments of the present application, and therefore should not be regarded as limiting the scope of the present application.

In the drawings.

1. Arc furnace; 2—Ladle refining furnace; 3—VOD; 4—RH; 5—Hollow graphite electrode; 6—Plasma torch; 7—Oxygen gun; 8—feeding funnel; 9—Wire feeding hole; 10—Gas flow meter; 11—Pressure gauge; 12—Flame arrester.

DETAILED DESCRIPTION OF THE EMBODIMENTS

As used in this article, "prepared by" and "containing" are synonymous. The terms "including", "include", "having", "containing" or any other variation thereof used in this article are intended to cover non-exclusive inclusion. For example, a composition, step, method, article, or device containing the listed elements does not need to be limited to those elements, but may include other elements not explicitly listed or inherent elements of such composition, step, method, article, or device.

The conjunction "composed of" excludes any unspecified elements, steps, or components. If used in a claim, this phrase will make the claim closed and exclude materials other than those described, except for conventional impurities associated with it. When the phrase "composed of" appears in the clause of the subject of the claim rather than immediately following the subject matter, it is limited to the elements described in that clause, and other elements are not excluded from the claims as a whole.

When equivalent, concentration, or other values or parameters are expressed in a range, preferred range, or a range limited by a series of upper and lower limit preferred values, it should be understood as specifically disclosing all ranges formed by any combination of upper or lower limit or preferred value of the range, regardless of whether the range is disclosed separately. For example, when the scope "1-5" is disclosed, the described scope should be understood as including ranges "1-4", "1-3", "1-2", "1-2 and 4-5", "1-3 and 5", etc. When the numerical range is described in this article, unless otherwise specified, it is intended to include its end value and all integers and fractions within that range.

In these embodiments, unless otherwise specified, the portions and percentages are measured by mass.

"Mass fraction" refers to the basic unit of measurement that represents the mass proportion relationship of multiple components. One fraction can represent any unit mass, such as 1 g or 2.689 g. If it is written that the mass fraction of component A is a and the mass fraction of component B is b, it means the ratio of the mass fraction of component A to component B is a:b. Alternatively, it can be expressed that the mass of component A is aK and the mass of component B is bK (K is any number, representing a multiple factor). It should not be misunderstood that, unlike the mass fraction, the sum of mass fractions of all components is not limited to the limit of 100 fractions.

"And/or" is used to indicate that one or both of the situations described may occur, for example, A and/or B include (A and B) and (A or B).

A high-efficiency method for controlling nitrogen in steelmaking by spraying hydrogen containing plasma, comprising:

when performing at least one of arc furnace smelting, ladle refining, VOD refining, and RH refining, using a mixture of hydrogen rich gas and argon gas to generate hydrogen plasma for denitrification of molten steel;

the arc furnace smelting comprises: spraying argon gas into the furnace through a hollow electrode, with a gas flow rate 10-30 NL/min/t, an inlet gas pressure 0.1-1.0 MPa, and a bottom blown argon gas flow rate of 1-5 NL/min/t; before performing power transmission and forming a molten pool, spraying the mixture of hydrogen rich gas and argon gas into the molten steel through a hollow graphite electrode, with a proportion of hydrogen rich gas of 5%-80%, a flow rate of 10-30 NL/min/t, an inlet gas pressure 0.1-1.0 MPa, and the bottom blown argon flow rate of 1-5 NL/min/t; from forming the molten pool to completely melting, spraying the mixture of hydrogen rich gas and argon gas into the molten steel through the hollow graphite electrode, with a proportion of hydrogen rich gas of 5%-80%, a flow rate of 20-30 NL/min/t, an inlet gas pressure 0.1-1.0 MPa, and the bottom blown argon flow rate of 2-6 NL/min/t; from completely melting to steelmaking, spraying the mixture of hydrogen rich gas and argon gas into the molten steel through the hollow graphite electrode, with a proportion of hydrogen rich gas of 10%-80%, a flow rate of 10-20 NL/min/t, an inlet gas pressure 0.1-1.0 MPa, and the bottom blown argon gas flow rate of 2-6 NL/min/t; during steelmaking, stopping the hollow graphite electrode from blowing gas;

the ladle refining comprises: adding refining slag after the previous process of steelmaking to cover a molten steel surface, preventing the molten steel from absorbing nitrogen; after moving a ladle car to a refining station, descending the hollow graphite electrode to 30-50 cm above a molten steel level, and introducing pure argon gas with a gas flow rate 10-20 NL/min/t, and an inlet gas pressure 0.1-0.6 MPa; during desulfurization of the molten steel under stirring, introducing pure argon gas with a gas flow rate 25-30 NL/min/t and an inlet gas pressure 0.1-0.6 MPa; after desulfurization under stirring, adding slag material, deoxidizer, and alloy to the ladle, introducing pure argon gas into the hollow graphite electrode, with a gas flow rate 5-10 NL/min/t and an inlet gas pressure 0.1-0.6 MPa; when performing power transmission for slagging, introducing the mixture of hydrogen rich gas and argon gas into the hollow graphite electrode, with a proportion of hydrogen rich gas of 5-80%, a total gas flow rate of 5-10 NL/min/t, and an inlet gas pressure 0.1-0.6 MPa; after slagging, the slag covers the arc as foam, the proportion of hydrogen rich gas is 5-80%, with a total gas flow 20-30 NL/min/t, and the inlet gas pressure is 0.4-0.5 MPa; after power transmission, lifting the hollow graphite electrode 30-50 cm above the molten steel, introducing pure argon gas, with a gas flow rate 10-20 NL/min/t and an inlet gas pressure 0.1-0.6 MPa; after refining the ladle, stopping the hollow graphite electrode from blowing air, lifting the electrode to a highest limit, and moving the ladle car to a hanging position;

the VOD refining process comprises: adjusting the bottom blown gas flow rate to 200 NL/min when vacuuming to 20-25 kPa, and simultaneously turning on a plasma torch to spray the mixture of hydrogen rich gas and argon gas, with a total flow rate of the mixture of 1-8 NL/min/t, a proportion of the hydrogen rich gas of 5%-80%, a total gas source pressure of 0.1-0.5 MPa, and a spraying time of 2-3 minutes; vacuuming to 3-10 kPa, stirring by bottom blowing, increasing the bottom blown gas flow rate to 500 NL/min, and keeping parameters of the plasma torch for spraying the mixture of hydrogen rich gas and argon gas; vacuuming to below 67 Pa, increasing the bottom blown gas flow rate to 800 NL/min, increasing the mixture flow rate of hydrogen rich gas and argon sprayed by the plasma torch to 2-10 NL/min/t, increasing the proportion of hydrogen rich gas to 20%-80%, and increasing the total gas source pressure to 0.1-0.5 MPa, and spraying for 10-15 minutes; stopping the plasma torch from spraying, keeping the bottom blown gas flow rate unchanged, keeping the vacuum degree below 67 Pa, keeping the pressure for 5-10 minutes, and removing H from the molten steel;

the RH refining process comprises: keeping the vacuum degree 7-10 kPa, turning on the plasma torch to blow the mixture of hydrogen rich gas and argon gas for pre-denitrification, with a total flow rate of 1-8 NL/min/t of the mixture, with the proportion of hydrogen rich gas of 5%-80%, a total gas source pressure 0.1-0.5 MPa, and processing for 2-3 minutes; vacuuming to below 3 kPa, spraying the mixture of hydrogen rich gas and argon gas by the plasma torch, keeping the spraying parameters unchanged, and performing initial denitrification for 3-5 minutes; vacuuming to below 67 Pa, spraying the mixture of hydrogen rich gas and argon gas into the plasma torch, increasing the total gas flow rate to 2-10 NL/min/t, and increasing the proportion of hydrogen rich gas to 20%-80%, performing deep denitrification while keeping the total gas source pressure unchanged, and processing for 10-15 minutes; stopping the plasma torch from spraying, keeping the vacuum degree below 67 Pa, further processing for 5-10 minutes, and removing H from the molten steel.

Optionally, the mixture flow rate is the flow rate of the mixture in each electrode, with a total of three electrodes, and the gas flow rate at the inlet of the three hollow electrodes is controlled by three gas pipelines. The material of the pipeline used for hydrogen rich gas is stainless steel.

In one embodiment, a pore size of the hollow graphite electrode is 2%-6% of an electrode diameter.

Optionally, a pore size of the hollow graphite electrode can be any value between 2%, 3%, 4%, 5%, 6%, or 2%-6% of an electrode diameter.

In one embodiment, the gas source pressure of the mixture of hydrogen rich gas and argon gas is 0.1-1.5 MPa.

Optionally, the gas source pressure of the mixture of hydrogen rich gas and argon gas can be any value between 0.1 MPa, 0.2 MPa, 0.3 MPa, 0.4 MPa, 0.5 MPa, 0.6 MPa, 0.7 MPa, 0.8 MPa, 0.9 MPa, 1.0 MPa, 1.1 MPa, 1.2 MPa, 1.3 MPa, 1.4 MPa, 1.5 MPa, or 0.1-1.5 MPa.

In one embodiment, a temperature of the molten steel entering the ladle during refining is 1580-1630° C.

Optionally, during refining the ladle, a temperature of the molten steel entering the ladle can be any value between 1580° C., 1590° C., 1600° C., 1610° C., 1620° C., 1630° C., or 1580-1630° C.

In one embodiment, the desulfurization time under intense stirring is 3-5 minutes.

Optionally, the desulfurization time under intense stirring can be any value between 3 minutes, 4 minutes, 5 minutes, or 3-5 minutes.

In one embodiment, after intensely stirring for desulfurization, adding deoxidizer to the ladle, then adding alloy, and finally adding slagging material, determining an addition amount of the deoxidizer based on incoming oxygen content, determining an addition amount of the alloy based on incoming composition, and the addition amount of the slagging material is 2-6 kg/t.

Optionally, the addition amount of the slagging material can be any value between 2 kg/t, 3 kg/t, 4 kg/t, 5 kg/t, 6 kg/t, or 2-6 kg/t.

In one embodiment, the slagging time is 3-5 minutes.

Optionally, the slagging time can be any value between 3 minutes, 4 minutes, 5 minutes, or 3-5 minutes.

In one embodiment, after slagging, the bottom blown gas flow rate is 3-6 NL/min/t.

Optionally, after slagging, the bottom blown gas flow rate can be any value between 1 NL/min/t, 2 NL/min/t, 3 NL/min/t, 4 NL/min/t, 5 NL/min/t, 6 NL/min/t, 7 NL/min/t, 8 NL/min/t, 9 NL/min/t, 10 NL/min/t, or 1-10 NL/min/t.

In one embodiment, multiple hollow graphite electrodes are provided, each of which meets the flow requirements.

In one embodiment, the hydrogen rich gas comprises one or more of CH4, H2, and coke oven gas after denitrification.

This method is applicable to the short steelmaking process of 50 t~350 t "arc furnace+LF+RH/VOD", or the long steelmaking process of 50 t~350 t "converter+LF+RH/VOD".

The following will provide a detailed description of the implementation of the present application in conjunction with specific embodiments. However, those skilled in the art will understand that the following embodiments are only intended to illustrate the present application and should not be considered as limiting the scope of the present application. If specific conditions are not specified in the embodiment, they shall be performed according to conventional conditions or conditions recommended by the manufacturer. The reagents or instruments used without specifying the manufacturer are conventional products that can be obtained through commercial purchase.

The device used in the embodiments of the application will be described firstly. The main equipment of the arc furnace and ladle refining furnace does not need to be modified, only solid electrodes need to be replaced with hollow electrodes, and valve groups used for controlling gas flow need to be added. In VOD/RH, only plasma torches and corresponding gas source valve groups need to be added, making the overall modification easy and the low investment cost. In the early stage of arc furnace and ladle refining, pure argon gas can be introduced to isolate the air and prevent the molten steel from absorbing nitrogen from the air. After performing power transmission, hydrogen rich gas is added to the hollow electrode, which forms an H plasma under the action of the arc and forms ammonia gas with N in the molten steel, which will significantly reducing the N content in the molten steel. The ladle refining process can reduce nitrogen, and some grades of steel may not need VOD/RH and shorten the overall smelting time, reduce production costs, and improve production efficiency. For steel grades with strict N content requirements, VOD/RH vacuuming can be performed after LF. Under H plasma and vacuum conditions, the nitrogen in the steel can be controlled within 10-20 ppm.

Figure 1:
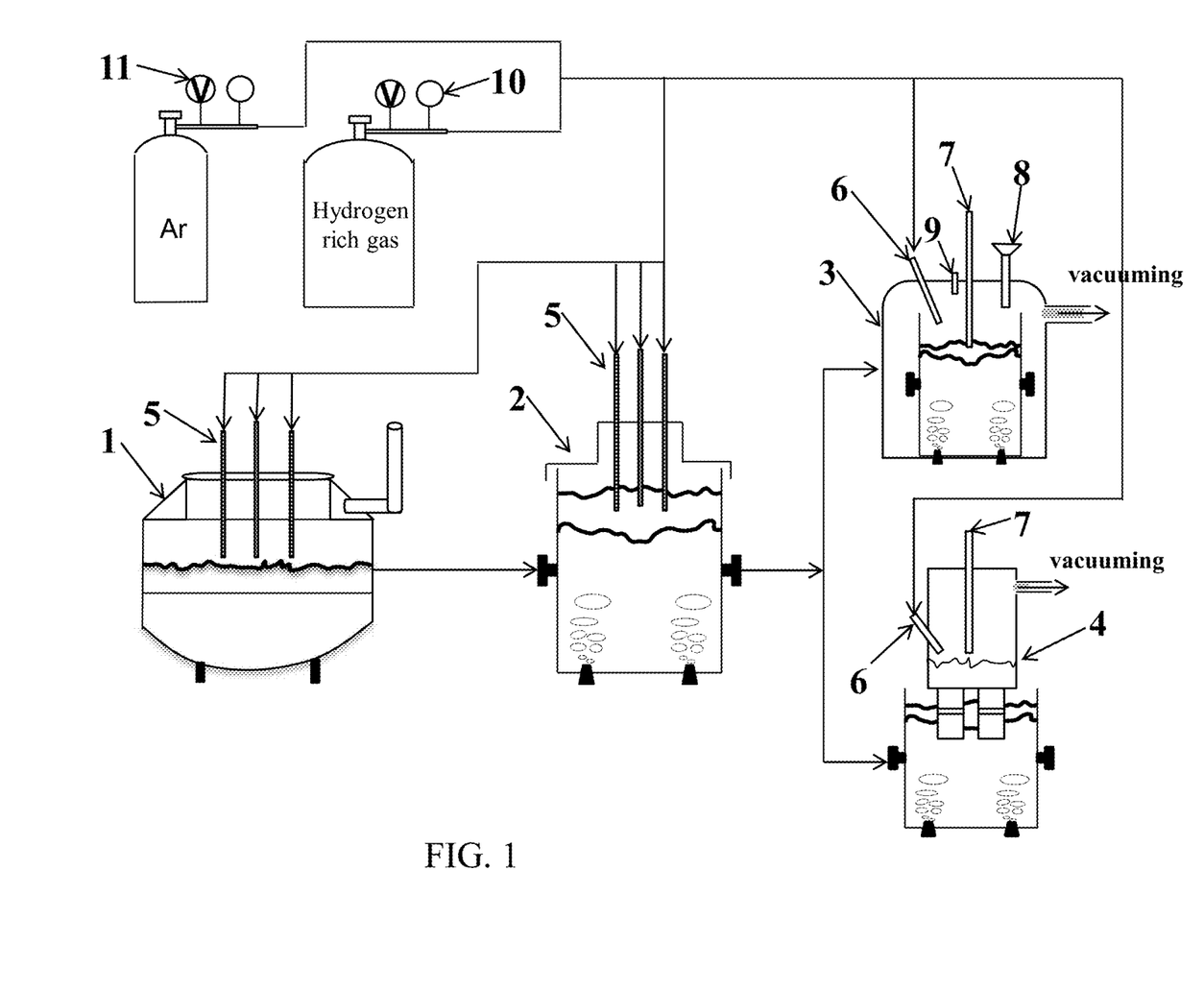
FIG. 1 shows the high-efficiency nitrogen control system for steelmaking by spraying hydrogen rich plasma used in the present embodiment of the application.
Figure 2:
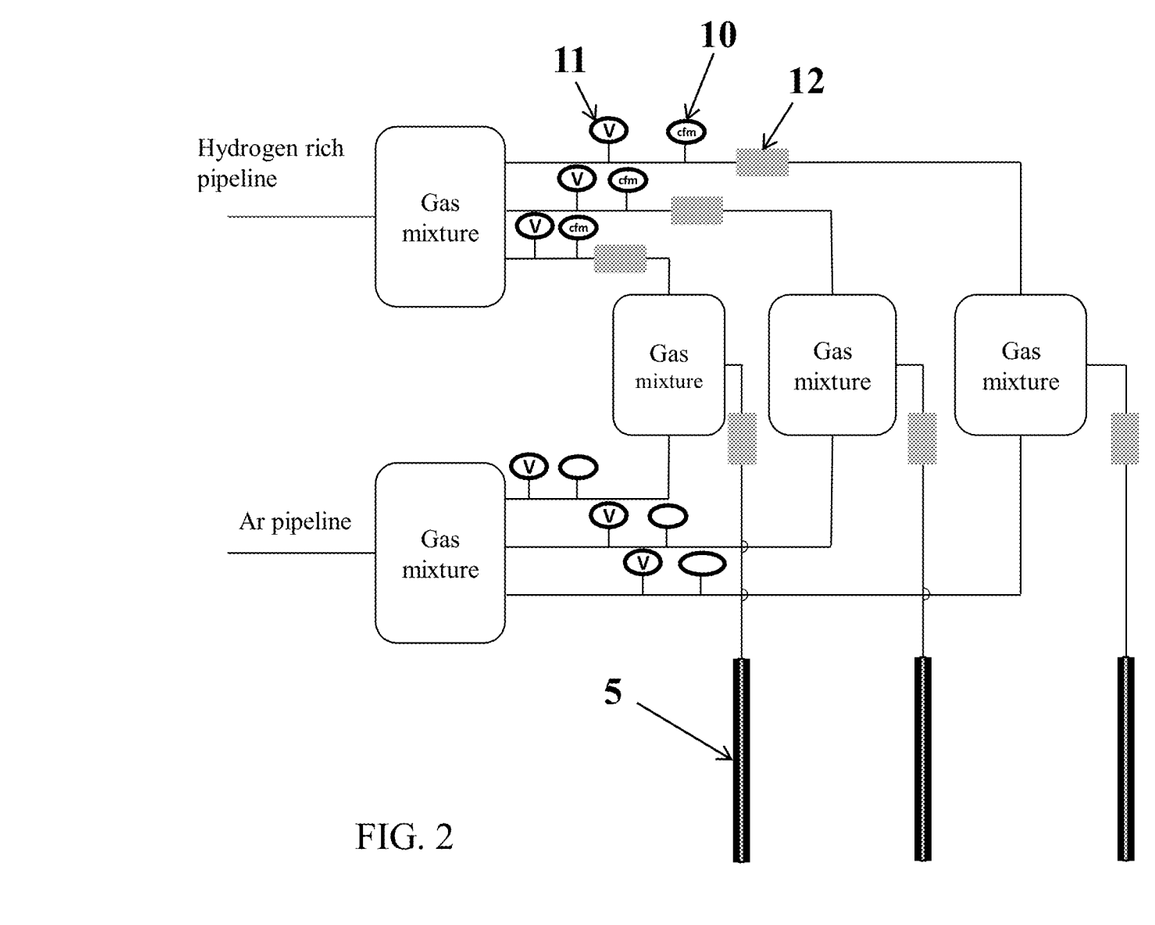
FIG. 2 shows the gas supply device of the high-efficiency nitrogen control system for steelmaking used in the present embodiment.

As shown in FIG. 1, a system for controlling nitrogen in steelmaking by spraying hydrogen rich plasma is used, comprising: arc furnace 1, ladle refining furnace 2, VOD 3, RH 4, arc furnace 1, wherein, ladle refining furnace 2 each equipped with 3 hollow graphite electrodes 5, VOD 3 equipped with plasma torch 6, oxygen gun 7, feeding funnel 8, feeding hole 9, RH 4 also equipped with plasma torch 6 and oxygen gun 7. The gas supply system comprises an argon gas storage tank and a hydrogen rich gas storage tank, corresponding gas flow meter 10, pressure gauge 11, and flame arrester 12 (as shown in FIG. 2).

Embodiment 1

A method for controlling nitrogen in steelmaking by spraying hydrogen containing plasma is provided, comprising the following steps:

the production process of a 150 t quantum arc furnace is EAF+LF+VOD+CC (electric arc furnace+ladle refining+vacuum oxygen decarburization furnace+continuous casting). The smelting process of the arc furnace is three-phase alternating current (AC) power supply, using three hollow graphite electrodes with a diameter of 650 mm and a diameter of 30 mm in the middle. The pressure of the Ar+CH4 gas source is 1.0 MPa. After passing through a pressure reduction valve, the inlet pressure of the Ar+CH4 gas can be adjusted within the range of 0.3-0.8 MPa. The pipes used in the hollow electrodes are all made of 316L stainless steel.

The specific steps of the denitrification process for hollow electrodes in arc furnace smelting:
- S1: after the scrap steel is loaded, turning on the hollow electrode gas source switch and spraying pure Ar into the furnace, with a gas flow rate 3000 NL/min, an inlet gas pressure 0.8 MPa, and a bottom blown gas flow rate 500 NL/min;
- S2: performing power transmission until the formation of the molten pool, and spraying 10% CH4+90% Ar into the hollow electrode, with a total mixture flow rate 3000 NL/min, an inlet gas pressure 0.8 MPa, and a bottom blown gas flow rate 500 NL/min;
- S3: from forming the molten pool to completely melting, spraying 20% CH4+80% Ar into the hollow electrode, with a total mixture flow rate 4000 NL/min, an inlet gas pressure 0.8 MPa, and a bottom blown gas flow rate 450 NL/min;
- S4: from completely melting to steelmaking, spraying 20% CH4+80% Ar into the hollow electrode, with a total mixture flow rate 3000 NL/min, an inlet gas pressure 0.8 MPa, and a bottom blown gas flow rate 450 NL/min;
- S5: during steelmaking, stopping the hollow electrode from blowing gas;

The ladle refining furnace is powered by three-phase AC power supply, using three hollow graphite electrodes with a diameter of 500 mm and a middle hole diameter of 30 mm. The Ar+CH4 gas source pressure is 1 MPa. After passing through a pressure reduction valve, the Ar+CH4 inlet pressure can be adjusted within a range of 0.5 MPa. The pipeline materials used in the hollow electrodes are all 316L stainless steel.

The specific steps of plasma denitrification process for hollow electrode in ladle refining:
- S1: after tapping from the arc furnace, adding 300 kg of refined slag to cover the molten steel surface to prevent nitrogen absorption by the molten steel;
- S2: after the ladle car moves to the refining station, descending the electrode to 50 cm above a molten steel level, turning on the hollow electrode gas source switch, introducing pure Ar to protect the molten steel, reducing the nitrogen partial pressure inside the ladle, to avoid direct contact between the molten steel and air for nitrogen absorption, with a gas flow rate 3000 NL/min, and an inlet gas pressure 0.5 MPa;
- S3: when the molten steel undergoes an intense stirring for desulfurization, introducing pure Ar to protect the molten steel and avoid nitrogen absorption, with a gas flow rate 4000 NL/min, and an inlet gas pressure 0.5 MPa;
- S4: after intense stirring for desulfurization, adding slag material, deoxidizer, and alloy to the ladle, introducing pure Ar into the hollow electrode, with a gas flow rate 1000 NL/min and an inlet gas pressure 0.3 MPa;
- S5: when performing power transmission for slagging, introducing Ar+CH4 into the hollow electrode, with a total gas flow rate 1000 NL/min, an inlet gas pressure 0.3 MPa, and a proportion of H2 5%;

S6: after slagging, foam slag covers the arc, and after the molten steel temperature increases, feeding the hollow electrode with Ar+CH4, with a total gas flow 3000 NL/min, an inlet gas pressure 0.5 MPa, and a proportion of CH4 10%;

S7: after power transmission, lifting the electrode to 50 cm above a molten steel level, turning off the CH4 gas source switch, simultaneously introducing pure Ar into the hollow electrode, with a gas flow rate 2000 NL/min and an inlet gas pressure 0.3 MPa;

S8: after desulfurization under intense stirring, introducing pure Ar into the hollow electrode, with a gas flow rate 1000 NL/min and an inlet gas pressure 0.3 MPa;

S9: At the beginning of the secondary power transmission, introducing Ar+CH4 into the hollow electrode, with a total gas flow rate 1000 NL/min, an inlet gas pressure 0.3 MPa, and a proportion of CH4 5%;

S10: foam slag covers the arc, and after the temperature of molten steel increases, introducing Ar+CH4 into the hollow electrode, with a total gas flow 3000 NL/min, an inlet gas pressure 0.5 MPa, and a proportion of CH4 10%;

S11: after the secondary power transmission, lifting the electrode to 50 cm above a molten steel level, turning off the CH4 gas source switch, simultaneously introducing pure Ar into the hollow electrode, with a gas flow rate 2000 NL/min and an inlet gas pressure 0.3 MPa;

S12: after refining the lade, stopping the hollow electrode from blowing air, lifting the electrode to a highest limit, and moving the ladle car to a hanging position.

The denitrification process of VOD refining comprises the following steps:

S1: when the vacuum degree reaches 20 kPa, adjusting the bottom blown gas flow rate to 200 NL/min, and simultaneously turning on the plasma torch to spray Ar+CH4, with a total mixture flow rate 300 NL/min, a proportion of the hydrogen rich gas 20%, a total gas source pressure 0.8 MPa, and spraying for 3 minutes;

S2: vacuuming to 5 kPa, increasing the bottom blown gas flow rate to 500 NL/min, and keeping the Ar+CH4 spraying parameters by the plasma torch unchanged;

S3: vacuuming to below 67 Pa, adjusting the bottom blown gas flow rate to 800 NL/min, and simultaneously increasing the mixture flow rate of the plasma torch to 500 NL/min, increasing the proportion of CH4 to 30%, keeping the total gas source pressure at 0.8 MPa, and spraying for 15 minutes;

S4: stopping the plasma torch from spraying, keeping the bottom blown gas flow rate unchanged, keeping the vacuum degree below 67 Pa, keeping the pressure for 8 minutes, and removing H from the molten steel;

The changes in nitrogen content of steel during the short steelmaking process in the arc furnace include: 50 ppm in steel exiting from the arc furnace, 52 ppm in steel entering the ladle refining station, 41 ppm in steel exiting from the ladle refining station, 44 ppm in steel entering the VOD station, and 20 ppm in steel exiting from the VOD station.

Embodiment 2

A method for controlling nitrogen in steelmaking by spraying hydrogen containing plasma is provided, comprising the following steps:

The smelting process of a 100 t steel arc furnace is EAF+LF+RH+CC (electric arc furnace+ladle refining+vacuum degassing furnace+continuous casting), which is three-phase AC power supply. Three hollow graphite electrodes with a diameter of 550 mm and a middle diameter of 25 mm are used, and the Ar+coke oven gas source pressure is 1 MPa. After passing through the pressure reduction valve, the Ar+coke oven gas inlet pressure can be adjusted within a range of 0.6 MPa. The pipeline materials used in the hollow electrodes are all 316L stainless steel.

The specific steps of the denitrification process for hollow electrodes in arc furnace smelting:

S1: after the scrap steel is loaded, turning on the hollow electrode gas source switch and spraying pure Ar into the furnace, with a gas flow rate 1500 NL/min, an inlet gas pressure 0.6 MPa, and a bottom blown gas flow rate 100 NL/min;

S2: performing power transmission until the formation of the molten pool, and spraying 10% coke oven gas+90% Ar into the hollow electrode, with a total mixture flow rate 2000 NL/min, an inlet gas pressure 0.6 MPa, and a bottom blown gas flow rate 200 NL/min;

S3: from forming the molten pool to completely melting, spraying 20% coke oven gas+80% Ar into the hollow electrode, with a total mixture flow rate 3000 NL/min, an inlet gas pressure 0.6 MPa, and a bottom blown gas flow rate 200 NL/min;

S4: from completely melting to steelmaking, spraying 20% coke oven coal gas+80% Ar into the hollow electrode, with a total mixture flow rate 3000 NL/min, an inlet gas pressure 0.6 MPa, and a bottom blown gas flow rate 200 NL/min;

S5: during steelmaking, stopping the hollow electrode from blowing gas;

The ladle refining furnace is powered by three-phase AC power supply, using three hollow graphite electrodes with a diameter of 450 mm and a middle hole diameter of 30 mm. The Ar+coke oven gas source pressure is 1 MPa. After passing through a pressure reduction valve, the inlet pressure of Ar+rich coke oven gas can be adjusted within a range of 0.5 MPa. The pipeline materials used in the hollow electrodes are all 316L stainless steel.

The specific steps of plasma denitrification process for hollow electrode in ladle refining:

S1: after tapping from the arc furnace, adding 200 kg of refined slag to cover the molten steel surface to prevent nitrogen absorption by the molten steel;

S2: after the ladle car moves to the refining station, descending the electrode to 50 cm above a molten steel level, turning on the hollow electrode gas source switch, introducing pure Ar to protect the molten steel, reducing the nitrogen partial pressure inside the ladle, to avoid direct contact between the molten steel and air for nitrogen absorption, with a gas flow rate 2000 NL/min, and an inlet gas pressure 0.4 MPa;

S3: when the molten steel undergoes an intense stirring for desulfurization, introducing pure Ar to protect the molten steel and avoid nitrogen absorption, with a gas flow rate 3000 NL/min, and an inlet gas pressure 0.5 MPa;

S4: after intense stirring for desulfurization, adding slag material, deoxidizer, and alloy to the ladle, introducing pure Ar into the hollow electrode, with a gas flow rate 2000 NL/min and an inlet gas pressure 0.4 MPa;

S5: when performing power transmission for slagging, introducing Ar+coke oven gas into the hollow electrode, with a total gas flow rate 1000 NL/min, an inlet gas pressure 0.3 MPa, and a proportion of coke oven gas 5%;

S6: after slagging, foam slag covers the arc, and after the molten steel temperature increases, introducing Ar+coke oven gas into the hollow electrode, with a total gas flow 3000 NL/min, an inlet gas pressure 0.5 MPa, and a proportion of coke oven gas 10%;

S7: after power transmission, lifting the electrode to 50 cm above a molten steel level, turning off the coke oven gas source switch, and simultaneously introducing pure Ar into the hollow electrode, with a gas flow rate 2000 NL/min and an inlet gas pressure 0.4 MPa;

S8: after refining the lade, stopping the hollow electrode from blowing air, lifting the electrode to a highest limit, and moving the ladle car to a hanging position.

The denitrification process in RH refining process comprises the following steps:

S1: keeping the vacuum degree at 7-10 kPa, turning on the plasma torch to spray Ar+coke oven gas, with a total mixture flow rate 1000 NL/min, a proportion of coke oven gas 20%, a total gas source pressure 0.6 MPa, and processing for 3 minutes;

S2: vacuuming to below 3 kpa, spraying Ar+coke oven gas by the plasma torch, keeping the spraying parameters unchanged, and processing for 5 minutes;

S3: vacuuming to below 67 Pa, spraying Ar+coke oven gas into the plasma torch, increasing the total gas flow rate to 2000 NL/min, increasing the proportion of coke oven gas to 30%, and keeping the total gas source pressure unchange, and processing for 12 minutes;

S4: stopping the plasma torch from spraying, keeping the vacuum degree below 67 Pa, further processing for 10 minutes, and removing H from the molten steel;

The changes in nitrogen content of steel during the short steelmaking process in the arc furnace include: 48 ppm in steel exiting from the arc furnace, 52 ppm in steel entering the ladle refining station, 37 ppm in steel exiting from the ladle refining station, 40 ppm VOD input, and 18 ppm VOD output.

Embodiment 3

A method for controlling nitrogen in steelmaking by spraying hydrogen containing plasma is provided, comprising the following steps:

The smelting process of a 100 t Consteel arc furnace is EAF+LF+VD+CC (electric arc furnace+ladle refining+vacuum degassing furnace+continuous casting), which is three-phase AC power supply. Three hollow graphite electrodes with a diameter of 500 mm are used, and the middle diameter is 20 mm. The Ar+coke oven coal gas source pressure is 1 MPa, and after passing through the pressure reduction valve, the Ar+coke oven gas inlet pressure can be adjusted within the range of 0-0.6 MPa. The pipeline material used in the hollow electrodes is stainless steel.

The specific steps of the denitrification process for hollow electrodes in arc furnace smelting:

S1: after the scrap steel is loaded, turning on the hollow electrode gas source switch and spraying pure Ar into the furnace, with a gas flow rate 1000 NL/min, an inlet gas pressure 0.4 MPa, and a bottom blown gas flow rate 150 NL/min;

S2: performing power transmission until the formation of the molten pool, and spraying 10% coke oven gas+90% Ar into the hollow electrode, with a total mixture flow rate 2500 NL/min, an inlet gas pressure 0.6 MPa, and a bottom blown gas flow rate 300 NL/min;

S3: from forming the molten pool to completely melting, spraying 20% coke oven gas+80% Ar into the hollow electrode, with a total mixture flow rate 2500 NL/min, an inlet gas pressure 0.6 MPa, and a bottom blown gas flow rate 300 NL/min;

S4: from completely melting to steelmaking, spraying 40% coke oven coal gas+80% Ar into the hollow electrode, with a total mixture flow rate of 2500 NL/min, an inlet gas pressure 0.6 MPa, and a bottom blown gas flow rate 300 NL/min;

S5: during steelmaking, stopping the hollow electrode from blowing gas;

The ladle refining furnace is powered by three-phase AC power supply, using three hollow graphite electrodes with a diameter of 400 mm and a middle hole diameter of 20 mm. The Ar+coke oven gas source pressure is 1 MPa. After passing through a pressure reduction valve, the Ar+coke oven gas inlet pressure can be adjusted within the range of 0-0.6 MPa. The pipeline material used in the hollow electrodes is stainless steel.

The specific steps of plasma denitrification process for hollow electrode in ladle refining:

S1: after tapping from the arc furnace, adding 200 kg of refined slag to cover a molten steel surface to prevent nitrogen absorption by the molten steel;

S2: after the ladle car moves to the refining station, descending the electrode to 30 cm above a molten steel level, turning on the hollow electrode gas source switch, introducing pure Ar to protect the molten steel, reducing the nitrogen partial pressure inside the ladle, to avoid direct contact between the molten steel and air for nitrogen absorption, with a gas flow rate 1500 NL/min, and an inlet gas pressure 0.4 MPa;

S3: when the molten steel undergoes an intense stirring for desulfurization, introducing pure Ar to protect the molten steel and avoid nitrogen absorption, with a gas flow rate 2500 NL/min, and an inlet gas pressure 0.6 MPa;

S4: after intense stirring for desulfurization, adding slag material, deoxidizer, and alloy to the ladle, introducing pure Ar into the hollow electrode, with a gas flow rate 2000 NL/min and an inlet gas pressure 0.5 MPa;

S5: when performing power transmission for slagging, introducing Ar+coke oven gas into the hollow electrode, with a total gas flow rate 1000 NL/min, an inlet gas pressure 0.3 MPa, and a proportion of coke oven gas 5%;

S6: after slagging, foam slag covers the arc, and after the molten steel temperature increases, introducing Ar+coke oven gas into the hollow electrode, with a total gas flow of 2500 NL/min, an inlet gas pressure 0.6 MPa, and a proportion of coke oven gas 10%;

S7: after power transmission, lifting the electrode to 50 cm above a molten steel level, turning off the coke oven gas source switch, and simultaneously introducing pure Ar into the hollow electrode, with a gas flow rate 1500 NL/min and an inlet gas pressure 0.4 MPa;

S8: after refining the lade, stopping the hollow electrode from blowing air, lifting the electrode to a highest limit, and moving the ladle car to a hanging position.

The denitrification process of VOD refining process comprises the following steps:

S1: when the vacuum degree reaches 20 kPa, adjusting the bottom blown gas flow rate to 200 NL/min, and simultaneously turning on the plasma torch to spray Ar+CH4, with a total mixture flow rate 800 NL/min, a proportion of the hydrogen rich gas 20%, a total gas source pressure 0.8 MPa, and spraying for 3 minutes;

S2: vacuuming to 5 kPa, increasing the bottom blown gas flow rate to 400 NL/min, and keeping the Ar+CH4 spraying parameters by the plasma torch unchanged;

S3: vacuuming to below 67 Pa, adjusting the bottom blown gas flow rate to 600 NL/min, and simultaneously increasing the mixture flow rate of the plasma torch to 1000 NL/min, CH4 accounts for 20%, the total gas source pressure remains at 0.8 MPa, and spraying for 15 minutes;

S4: stopping the plasma torch from spraying, keeping the bottom blown gas flow rate unchanged, keeping the vacuum degree below 67 Pa, keeping the pressure for 8 minutes, and removing H from the molten steel;

The changes in nitrogen content of steel during the short steelmaking process in the arc furnace include: 60 ppm in steel exiting from the arc furnace, 68 ppm in steel entering the ladle refining station, 59 ppm in steel exiting from the ladle refining station, 64 ppm in steel entering the VOD station, and 22 ppm in steel exiting from the VOD station.

Comparative Embodiment 1

This comparative embodiment only performs Ar blowing in hollow electrodes, which comprises the following steps:

The smelting process of a 60 t steel arc furnace is EAF+LF+VD+CC (electric arc furnace+ladle refining+vacuum degassing furnace+continuous casting), which is three-phase AC power supply. Three hollow graphite electrodes with a diameter of 400 mm are used, and the middle diameter is 20 mm. The Ar gas source pressure is 1 MPa. After passing through the pressure reduction valve, the Ar gas inlet pressure can be adjusted within the range of 0-0.6 MPa. The pipeline material used in the hollow electrode is stainless steel.

The specific steps of the denitrification process for hollow electrodes in arc furnace smelting:

S1: after the scrap steel is loaded, turning on the hollow electrode gas source switch and spraying pure Ar into the furnace, with a gas flow rate 500 NL/min, an inlet gas pressure 0.2 MPa, and a bottom blown gas flow rate 100 NL/min;

S2: performing power transmission until the formation of the molten pool, and spraying Ar into the hollow electrode, with a total gas flow 800 NL/min, an inlet gas pressure 0.3 MPa, and a bottom blown gas flow rate 150 NL/min;

S3: from forming the molten pool to completely melting, spraying Ar into the hollow electrode, with a total gas flow rate 600 NL/min, an inlet gas pressure 0.25 MPa, and a bottom blown gas flow rate 1500 NL/min;

S4: from completely melting to steelmaking, spraying Ar into the hollow electrode, with a total gas flow rate 600 NL/min, an inlet gas pressure 0.25 MPa, and a bottom blown gas flow rate 1500 NL/min;

S5: during steelmaking, stopping the hollow electrode from blowing gas;

The ladle refining furnace is powered by three-phase AC power supply, using three hollow graphite electrodes with a diameter of 300 mm and a middle hole diameter of 20 mm. The Ar pressure is 1 MPa. After passing through a pressure reduction valve, the Ar gas inlet pressure can be adjusted within the range of 0-0.6 MPa. The pipeline material used in the hollow electrodes is stainless steel.

The specific steps of plasma denitrification process for hollow electrode in ladle refining:

S1: after tapping from the arc furnace, adding 100 kg of refined slag to cover the molten steel surface and prevent nitrogen absorption by the molten steel;

S2: after the ladle car moves to the refining station, descending the electrode to 30 cm above a molten steel level, turning on the hollow electrode gas source switch, introducing pure Ar to protect the molten steel, reducing the nitrogen partial pressure inside the ladle, to avoid direct contact between the molten steel and air for nitrogen absorption, with a gas flow rate 500 NL/min, and an inlet gas pressure 0.2 MPa;

S3: when the molten steel undergoes an intense stirring for desulfurization, introducing pure Ar to protect the molten steel and avoid nitrogen absorption, with a gas flow rate 800 NL/min, and an inlet gas pressure 0.3 MPa;

S4: after intense stirring for desulfurization, adding slag material, deoxidizer, and alloy to the ladle, introducing pure Ar into the hollow electrode, with a gas flow rate 600 NL/min and an inlet gas pressure 0.25 MPa;

S5: when performing power transmission for slagging, introducing pure Ar into the hollow electrode, with a total gas flow rate 500 NL/min and an inlet gas pressure 0.2 MPa;

S6: after slagging, foam slag covers the arc, and after the temperature of molten steel increases, introducing pure Ar into the hollow electrode, with a total gas flow 500 NL/min, and an inlet gas pressure 0.2 MPa;

S7: after power transmission, lifting the electrode to 50 cm above a molten steel level, and introducing pure Ar into the hollow electrode, with a gas flow rate 500 NL/min, and an inlet gas pressure 0.2 MPa;

S8: after refining the lade, stopping the hollow electrode from blowing air, lifting the electrode to a highest limit, and moving the ladle car to a hanging position.

The denitrification process of VOD refining process comprises the following steps:

S1: when the vacuum degree reaches 20 kPa, adjusting the bottom blown gas flow rate to 140 NL/min, and simultaneously turning on the plasma torch to spray Ar, with a total gas flow rate 800 NL/min, a total gas source pressure 0.3 MPa, and spraying for 3 minutes;

S2: vacuuming to 5 kPa, increasing the bottom blown gas flow rate to 200 NL/min, and keeping the parameters of plasma torch spraying Ar unchanged;

S3: vacuuming to below 67 Pa, adjusting the bottom blown gas flow rate to 200 NL/min, and simultaneously increasing the mixture flow rate of the plasma torch to 500 NL/min, with a total gas source pressure 0.25 MPa, and spraying for 15 minutes;

S4: stopping the plasma torch from spraying, keeping the bottom blown gas flow rate unchanged, keeping the vacuum degree below 67 Pa, keeping the pressure for 8 minutes, and removing H from the molten steel;

The changes in nitrogen content of steel during the short steelmaking process in the arc furnace include: 70 ppm in steel exiting from the arc furnace, 79 ppm in steel entering the ladle refining station, 82 ppm in steel exiting from the ladle refining station, 88 ppm in steel entering the VOD station, and 45 ppm in steel exiting from the VOD station.

Comparative Embodiment 2

This comparative embodiment only provides the refining process of blowing mixture Ar+CH4 into hollow electrodes, while other processes are the same as existing technologies (using solid electrodes without spraying gas), including the following steps:

The ladle refining furnace is powered by three-phase AC power supply, using three hollow graphite electrodes with a diameter of 400 mm and a middle hole diameter of 20 mm. The Ar+coke oven gas source pressure configured is 1 MPa. After passing through a pressure reduction valve, the Ar+coke oven gas inlet pressure can be adjusted within the range of 0-0.6 MPa. The pipeline material used in the hollow electrodes is stainless steel.

The specific steps of plasma denitrification process for hollow electrode in ladle refining:

S1: after tapping from the arc furnace, adding 200 kg of refined slag to cover a molten steel surface to prevent nitrogen absorption by the molten steel;

S2: after the ladle car moves to the refining station, descending the electrode to 30 cm above a molten steel level, turning on the hollow electrode gas source switch, introducing pure Ar to protect the molten steel, reducing the nitrogen partial pressure inside the ladle, to avoid direct contact between the molten steel and air for nitrogen absorption, with a gas flow rate 1500 NL/min, and an inlet gas pressure 0.4 MPa;

S3: when the molten steel undergoes an intense stirring for desulfurization, introducing pure Ar to protect the molten steel and avoid nitrogen absorption, with a gas flow rate 2500 NL/min, and an inlet gas pressure 0.6 MPa;

S4: after intense stirring for desulfurization, adding slag material, deoxidizer, and alloy to the ladle, introducing pure Ar into the hollow electrode, with a gas flow rate 2000 NL/min and an inlet gas pressure 0.5 MPa;

S5: when performing power transmission for slagging, introducing Ar+coke oven gas into the hollow electrode, with a total gas flow rate 1000 NL/min, an inlet gas pressure 0.3 MPa, and a proportion of coke oven gas 5%;

S6: after slagging, foam slag covers the arc, and after the molten steel temperature increases, introducing Ar+coke oven gas into the hollow electrode, with a total gas flow of 2500 NL/min, an inlet gas pressure 0.6 MPa, and a proportion of coke oven gas of 10%;

S7: after power transmission, lifting the electrode to 50 cm above a molten steel level, turning off the coke oven gas source switch, and simultaneously introducing pure Ar into the hollow electrode, with a gas flow rate 1500 NL/min and an inlet gas pressure 0.4 MPa;

S8: after refining the lade, stopping the hollow electrode from blowing air, lifting the electrode to a highest limit, and moving the ladle car to a hanging position.

The nitrogen content in steel during this refining process has changed: 66 ppm in steel entering the ladle refining station and 47 ppm in steel exiting the ladle refining station.

Finally, it should be noted that the above embodiments are only used to illustrate the technical solution of the present application, and not to limit it. Although detailed explanations have been provided for the present application with reference to the aforementioned embodiments, those skilled in the art should understand that they can still modify the technical solutions recorded in the aforementioned embodiments, or equivalently replace some or all of their technical features. These modifications or replacements do not make the essence of the corresponding technical solutions deviate from the scope of the technical solutions in the various embodiments of the application.

In addition, those skilled in the art can understand that although some embodiments herein include certain features included in other embodiments rather than other features, the combination of features in different embodiments means being within the scope of the present application and forming different embodiments. For example, in the above claims, any one of the claimed embodiments can be used in any combination. The information disclosed in the background section is only intended to deepen the understanding of the overall background technology of the application, and should not be regarded as acknowledging or implying in any form that the information constitutes prior art that is already known to those skilled in the art.

What is claimed is:

1. A method for controlling nitrogen in steelmaking by spraying hydrogen containing plasma, comprising:

performing arc furnace smelting, ladle refining and Vacuum Oxygen Decarburization (VOD) refining, alternatively performing arc furnace smelting, ladle refining and Ruhstahl Hausen (RH) refining;

when performing at least one of the arc furnace smelting, the ladle refining, the VOD refining, and the RH refining, using a mixture of hydrogen rich gas and argon gas to generate hydrogen plasma for denitrification of molten steel;

wherein the arc furnace smelting comprises: spraying argon gas into the furnace through a hollow graphite electrode, with a gas flow rate 10-30 NL/min/t, an inlet gas pressure 0.1-1.0 MPa, and a bottom blown argon gas flow rate of 1-5 NL/min/t; before performing power transmission and forming a molten pool, spraying the mixture of hydrogen rich gas and argon gas into the molten steel through the hollow graphite electrode, with a proportion of hydrogen rich gas of 5%-80%, a flow rate of 10-30 NL/min/t, an inlet gas pressure 0.1-1.0 MPa, and the bottom blown argon flow rate of 1-5 NL/min/t; from forming the molten pool to completely melting, spraying the mixture of hydrogen rich gas and argon gas into the molten steel through the hollow graphite electrode, with a proportion of hydrogen rich gas of 5%-80%, a flow rate of 20-30 NL/min/t, an inlet gas pressure 0.1-1.0 MPa, and the bottom blown argon flow rate of 2-6 NL/min/t; from completely melting to steelmaking, spraying the mixture of hydrogen rich gas and argon gas into the molten steel through the hollow graphite electrode, with a proportion of hydrogen rich gas of 10%-80%, a flow rate of 10-20 NL/min/t, an inlet gas pressure 0.1-1.0 MPa, and the bottom blown argon gas flow rate of 2-6 NL/min/t; during steelmaking, stopping the hollow graphite electrode from blowing gas;

the ladle refining comprises: adding refining slag after the arc furnace smelting to cover a molten steel surface, preventing the molten steel from absorbing nitrogen; after moving a ladle car to a refining station, descending the hollow graphite electrode to 30-50 cm above a molten steel level, and introducing pure argon gas with a gas flow rate 10-20 NL/min/t, and an inlet gas pressure 0.1-0.6 MPa; during desulfurization of the molten steel, introducing pure argon gas blowing from a bottom nozzle to cause stirring of the molten steel with a gas flow rate 25-30 NL/min/t and an inlet gas pressure 0.1-0.6 MPa; after desulfurization under stirring, adding slag material, deoxidizer, and alloy to the ladle, introducing pure argon gas into the hollow graphite electrode, with a gas flow rate 5-10 NL/min/t and an inlet gas pressure 0.1-0.6 MPa; when performing power transmission for slagging, introducing the mixture of hydrogen rich gas and argon gas into the hollow graphite electrode, with a proportion of hydrogen rich gas of 5-80%, a total gas flow rate of 5-10 NL/min/t, and an inlet gas pressure 0.1-0.6 MPa; after slagging, the slag covers the arc as foam, the proportion of hydrogen rich gas is 5-80%, with a total gas flow 20-30 NL/min/t, and the inlet gas pressure is 0.4-0.5 MPa; after power transmission, lifting the hollow graphite electrode 30-50 cm above the molten steel, introducing pure argon gas, with a gas flow rate 10-20 NL/min/t and an inlet gas pressure 0.1-0.6 MPa; after refining the ladle, stopping the hollow graphite electrode from blowing gas, lifting the electrode to a highest limit, and moving the ladle car to a hanging position;

the VOD refining process comprises: adjusting the bottom blown gas flow rate to 200 NL/min when vacuuming to 20-25 kPa, and simultaneously turning on a plasma torch to spray the mixture of hydrogen rich gas and argon gas, with a total flow rate of the mixture of 1-8 NL/min/t, a proportion of the hydrogen rich gas of 5%-80%, a total gas source pressure of 0.1-0.5 MPa, and a spraying time of 2-3 minutes; vacuuming to 3-10 kPa, stirring by bottom blowing, increasing the bottom blown gas flow rate to 500 NL/min, and keeping parameters of the plasma torch for spraying the mixture of hydrogen rich gas and argon gas; vacuuming to below 67 Pa, increasing the bottom blown gas flow rate to 800 NL/min, increasing the mixture flow rate of hydrogen rich gas and argon sprayed by the plasma torch to 2-10 NL/min/t, increasing the proportion of hydrogen rich gas to 20%-80%, and increasing the total gas source pressure to 0.1-0.5 MPa, and spraying for 10-15 minutes; stopping the plasma torch from spraying, keeping the bottom blown gas flow rate unchanged, keeping the vacuum degree below 67 Pa, keeping the pressure for 5-10 minutes, and removing hydrogen from the molten steel;

the RH refining process comprises: vacuuming to 7-10 kPa, turning on the plasma torch to blow the mixture of hydrogen rich gas and argon gas for pre-denitrification, with a total flow rate of 1-8 NL/min/t of the mixture, with the proportion of hydrogen rich gas of 5%-80%, a total gas source pressure 0.1-0.5 MPa, and processing for 2-3 minutes; vacuuming to below 3 kPa, spraying the mixture of hydrogen rich gas and argon gas by the plasma torch, keeping the spraying parameters unchanged, and performing initial denitrification for 3-5 minutes; vacuuming to below 67 Pa, spraying the mixture of hydrogen rich gas and argon gas into the plasma torch, increasing the total gas flow rate to 2-10 NL/min/t, and increasing the proportion of hydrogen rich gas to 20%-80%, performing deep denitrification while keeping the total gas source pressure unchanged, and processing for 10-15 minutes; stopping the plasma torch from spraying, keeping the vacuum degree below 67 Pa, further processing for 5-10 minutes, and removing hydrogen from the molten steel.

2. The method for controlling nitrogen in steelmaking by spraying hydrogen containing plasma according to claim 1, wherein a pore size of the hollow graphite electrode is 2%-6% of an electrode diameter.

3. The method for controlling nitrogen in steelmaking by spraying hydrogen containing plasma according to claim 1, wherein during refining the ladle, a temperature of the molten steel entering the ladle is 1580-1630° C.

4. The method for controlling nitrogen in steelmaking by spraying hydrogen containing plasma according to claim 1, wherein after intensely stirring for desulfurization, adding deoxidizer to the ladle, then adding alloy, and finally adding slagging material, determining an addition amount of the deoxidizer based on incoming oxygen content, determining an addition amount of the alloy based on incoming composition, and the addition amount of the slagging material is 2-6 kg/t.

5. The method for controlling nitrogen in steelmaking by spraying hydrogen containing plasma according to claim 1, wherein the hydrogen rich gas comprises one or more of $CH_4$, $H_2$, and coke oven gas after nitrogen removal.

\* \* \* \* \*